2,925,439

PREPARATION OF ALKYLDIBORANES

Earl L. Muetterties, Chadds Ford, Pa., assignor to E. I. du Pont de Nemours and Company, Wilmington, Del., a corporation of Delaware No Drawing. Application June 3, 1957
Serial No. 662,978

6 Claims. (Cl. 260—606.5)

This invention relates to the preparation of organoboron compounds. More particularly, it relates to a new and improved method for preparing alkyldiboranes.

The alkyldiboranes are a little known class of compounds that are becoming of interest as high energy fuels and as intermediates in the formation of alkyl derivatives of higher boron hydrides.

This invention has as an object a more economical preparation of alkyldiboranes. A further object is provision of a novel method for preparing alkyldiboranes from cheap and readily available materials. Still another object is provision of a one-step synthesis of unsymmetrical dialkyldiboranes and tetraalkyldiboranes.

These objects are accomplished in accordance with the present invention by a process which comprises heating a mixture of a boron halide, alkyl halide, and aluminum in the presence of hydrogen at a temperature of at least 80° C. under a pressure of at least 50 atmospheres. The halogens in the boron halides and alkyl halides that are operable in the process of this invention can be the same or different but in every instance they have an atomic number of at least 17, i.e., they are chlorine, bromine or iodine.

The reaction involved in forming the alkyldiboranes by the process of this invention is illustrated by the following ideal equations:

(1)   $6BX_3 + 6H_2 + 6RX + 8Al \rightarrow 3R_2B_2H_4 + 8AlX_3$ (2) 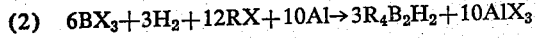  $6BX_3 + 3H_2 + 12RX + 10Al \rightarrow 3R_4B_2H_2 + 10AlX_3$ wherein X is chlorine, bromine or iodine and R is an alkyl radical, preferably an alkyl having from 1 to 8 carbon atoms.

The proportions of reactants used in the process of this invention can vary widely. It is, however, essential that a molar ratio of alkyl halide to aluminum of at least 0.16:1 be used to obtain an alkyldiborane. Molar ratios of alkyl halide to aluminum of 0.16–3:1 give satisfactory results, although ratios of 0.3–2:1 are preferred in the practice of this invention. Likewise, the molar ratios of alkyl halide to boron halide used in the process can vary widely, ratios ranging from 1–6:1 being operable. The preferred molar ratios of alkyl halide to boron halide are 1–3:1.

The process of this invention can be carried out in the absence of any added catalyst. However, the use of catalysts such as iodine, aluminum trichloride, or mixtures of these in any proportions, can be used if desired. Their use is beneficial in that they facilitate and moderate the reaction. These catalysts can be used in amounts ranging up to 2% of the total weight of the reaction mixture.

A preferred embodiment of the process of this invention is carried out as follows: A corrosion-resistant reaction vessel capable of withstanding high pressures, e.g., a stainless steel-lined pressure vessel, is charged with aluminum powder, an alkyl halide and the catalyst, if one is used, e.g., 0.5% by weight (based on the total charge) of iodine and 0.5% of aluminum trichloride. The vessel is then closed and cooled to low temperature, e.g., to −80° C. by means of a bath of acetone and solid carbon dioxide, and is then evacuated. The boron halide is then distilled into the reaction vessel and sufficient hydrogen is introduced to provide a pressure of at least 50 atmospheres at the reaction temperature. Preferably, a hydrogen pressure of 200–800 atmospheres at the operating temperature is used. Pressures above 1000 atmospheres are less desirable since they are detrimental to the yields of desired alkyldiboranes.

The reaction vessel is then heated to a preferred reaction temperature of 80–180° C. for a period of time ranging from 1 to 10 hours or more. As will be readily apparent to those skilled in the art, the exact reaction time is dependent on the particular temperature being employed. When the reaction is carried out at temperatures of 140–180° C., the reaction time is preferably 3 hours or less. When temperatures of 80–140° C. are being used, longer times, for example, 3–10 hours, are satisfactory. In some cases when the initial reaction is quite exothermic, e.g., when methyl iodide is employed as the alkyl halide, it is desirable to heat the reaction mixture to a moderate temperature, e.g., 50–100° C. for 1 hour or more before raising it to the desired higher reaction temperature.

After the reaction mixture has been heated at 80–180° C. for the desired time, the reaction vessel is cooled to room temperature, e.g., 20–30° C. and gaseous reaction products are carefully bled through a trap cooled to a low temperature, for example, by means of liquid nitrogen in order to recover condensable gases. The composition of condensable gases obtained can be determined readily by means of the mass spectrometer and by infrared absorption. The condensable gases can be separated into individual products by means of low temperature distillation. Excess liquid reactants and unreacted liquid starting materials can be recovered by fractional distillation from the residue in the reaction vessel. When higher alkyl halides are used, the alkyldiboranes are less volatile and are found in the liquid products.

The process of this invention is also capable of being carried out continuously by passing liquid and gaseous reactants through a reactor containing aluminum particles heated to the desired temperature and maintained at a pressure of at least 50 atmospheres. In this embodiment much shorter reaction times can be employed, a reaction time as little as 1 minute being operable.

The reactants used in the process of this invention can be of the grades commercially available. The hydrogen should be oxygen-free. The aluminum can be any of the types and degrees of purity commercially available, for example, aluminum powder, granules or turnings of various sizes. Aluminum particles of a size that pass through a standard 30-mesh screen or even finer are especially useful. Because of more rapid reaction rate and generally higher conversions obtained, it is preferred to use aluminum particles having as high a surface area per unit weight as practical.

The process of this invention is illustrated in further detail by the following example in which the proportions of ingredients are expressed in parts by weight unless otherwise specified.

Example

A stainless steel-lined pressure vessel is charged with 50 parts of aluminum powder, 94 parts of methyl iodide, 1 part of iodine and 1 part of aluminum trichloride. The vessel is then closed, cooled to about −80° C. and evacuated. Thirty parts of boron trichloride is then distilled into the reaction vessel and hydrogen is introduced in an amount sufficient to produce a pressure of 800 atmospheres at the operating temperature of 160° C. The reaction vessel is then heated to 80° C. for 3 hours and to 160° C. for 2 hours. After the reaction vessel is cooled to room temperature (25° C.), it is opened and the condensable gases are bled through a trap cooled by liquid nitrogen. There is isolated 2.7 parts of condensed gaseous products. Plugging of the outlet to the reaction vessel prevented complete recovery of the gaseous products. Analyses of the mass spectrographic data and infrared absorption data obtained on this gaseous product indicate that it is a mixture of unsymmetrical dimethyldiborane and tetramethyldiborane with the former the most abundant species. Distillation of the gaseous products yields a major fraction (60–80% of the total) boiling at −1 to +1° C. and a minor fraction (20–40% of the total) boiling at 58–64° C. The boiling points reported in the literature for dimethyl- and tetramethyldiboranes are −2.6° C. and 68.6° C., respectively.

The example has illustrated the process of this invention by specific reference to the reaction of a certain alkyl halide and a certain boron halide with aluminum and hydrogen. However, the process is generic to the use of any alkyl halide and boron halide provided the halogen of the halides are chlorine, bromine or iodine. Alkyl halides having from 1 to 8 carbons are especially preferred since they are more reactive. Thus, specific alkyl halides that are operable include ethyl bromide, methyl chloride, methyl bromide, n-butyl iodide, n-octyl chloride, and isobutyl chloride. Likewise, other boron halides that are operable include boron tribromide and boron triiodide. As already indicated, the halogen of the alkyl halide need not be identical with the halogen of the boron halide.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for preparing alkyldiboranes which comprises heating a mixture of a boron halide, an alkyl halide and aluminum in the presence of hydrogen at a temperature of at least 80° C. under a presssure of at least 50 atmospheres, the halogens in said halides being selected from the group consisting of chlorine, bromine, and iodine, the molar ratio of alkyl halide to aluminum being at least 0.16 to 1, and the molar ratio of alkyl halide to boron halide being from 1:1 to 6:1.

2. Process of claim 1 wherein a catalyst selected from the group consisting of iodine, aluminum trichloride, and mixtures thereof, is added to the reaction mixture in an amount up to 2% of the total weight of the reaction mixture.

3. Process of claim 1 wherein the molar ratios of alkyl halide to aluminum range up to 3:1.

4. A process for preparing unsymmetrical dialkyldiboranes and tetraalkyldiboranes which comprises heating a boron halide, an alkyl halide, and aluminum in the presence of hydrogen at a temperature within the range of 80 to 180° C. under a pressure of 200–800 atmospheres, the halogens in said halides having an atomic number of at least 17, the molar ratios of alkyl halide to aluminum ranging from 0.16:1 to 3:1, and the molar ratios of alkyl halide to boron halide ranging from 1:1 to 3:1.

5. Process of claim 4 wherein the molar ratios of alkyl halide to aluminum range from 0.3:1 to 2:1.

6. Process of claim 4 wherein the boron halide is boron trichloride, the alkyl halide is methyl iodide and the products which are obtained are unsymmetrical dimethyldiborane and tetramethyldiborane.

References Cited in the file of this patent

UNITED STATES PATENTS 2,446,008    Hurd _____ July 27, 1948

OTHER REFERENCES

Stock: "Hydrides of Boron and Silicon," Cornell Univ. Press, Ithaca, N.Y. (1933), pages 99, 100.